United States Patent
Sasaki et al.

(10) Patent No.: US 11,686,231 B2
(45) Date of Patent: Jun. 27, 2023

(54) LNT LAYERED CATALYST FOR LEAN BURN GASOLINE ENGINE AND EXHAUST GAS PURIFICATION APPARATUS USING THE SAME

(71) Applicants: N.E. CHEMCAT Corporation, Tokyo (JP); SUBARU CORPORATION, Tokyo (JP)

(72) Inventors: Yasuyoshi Sasaki, Tokyo (JP); Isao Tan, Tokyo (JP); Shunsuke Fukutomi, Tokyo (JP); Takehiro Fujimura, Tokyo (JP); Shuya Omata, Tokyo (JP)

(73) Assignees: N.E. CHEMCAT Corporation, Tokyo (JP); SUBARU CORPORATION, Tokyo (JP)

(*) Notice: Subject to any disclaimer, the term of this patent is extended or adjusted under 35 U.S.C. 154(b) by 94 days.

(21) Appl. No.: 17/177,315

(22) Filed: Feb. 17, 2021

(65) Prior Publication Data

US 2021/0270165 A1    Sep. 2, 2021

(30) Foreign Application Priority Data

Feb. 28, 2020 (JP) ................. 2020-033355

(51) Int. Cl.
*B01J 21/04* (2006.01)
*B01J 23/02* (2006.01)
(Continued)

(52) U.S. Cl.
CPC ............ *F01N 3/0814* (2013.01); *B01J 23/02* (2013.01); *B01J 23/42* (2013.01); *B01J 29/74* (2013.01);
(Continued)

(58) Field of Classification Search
CPC ... B01J 21/04; B01J 23/02; B01J 23/10; B01J 23/42; B01J 23/44; B01J 23/464;
(Continued)

(56) References Cited

U.S. PATENT DOCUMENTS 5,057,483 A * 10/1991 Wan ..................... B01J 23/6562
                                                      423/213.5
5,130,109 A *  7/1992 Wan ....................... B01J 23/624
                                                      423/247
(Continued)

FOREIGN PATENT DOCUMENTS

JP      2010-510884 A    4/2010
JP      2013-053583 A    3/2013
(Continued)

*Primary Examiner* — Cam N. Nguyen
(74) *Attorney, Agent, or Firm* — Oblon, McClelland, Maier & Neustadt, L.L.P.

(57) ABSTRACT

Provided are an LNT layered catalyst for a lean burn gasoline engine having an enhanced NOx storage rate and capable of developing a higher NOx purification rate, and an exhaust gas purification apparatus using the same, the LNT layered catalyst including a substrate, a first catalyst layer including ceria-alumina particles carrying Pt, Pd, and BaO, and a second catalyst layer including ceria-alumina particles carrying Pt and Rh, in which a content of Pt in the first catalyst layer is 0.45 to 0.85 mass %; among Pt included in the first catalyst layer, a content proportion in a first depth region is 88 to 90 mass %, and a content proportion in a second depth region is 10 to 12 mass %; a content of Ba in the first catalyst layer is 4 to 11 mass %; and the second catalyst layer is substantially free from Ba.

10 Claims, 4 Drawing Sheets

(51) Int. Cl.

| | |
|---|---|
| *B01J 23/10* | (2006.01) |
| *B01J 23/42* | (2006.01) |
| *B01J 23/44* | (2006.01) |
| *B01J 23/46* | (2006.01) |
| *B01J 23/56* | (2006.01) |
| *B01J 23/58* | (2006.01) |
| *B01J 23/63* | (2006.01) |
| *B01J 35/00* | (2006.01) |
| *F01N 3/08* | (2006.01) |
| *F01N 3/10* | (2006.01) |
| *F01N 3/28* | (2006.01) |
| *B01J 29/74* | (2006.01) |
| *B01J 37/02* | (2006.01) |

(52) U.S. Cl.
CPC ............. *B01J 35/002* (2013.01); *B01J 37/02* (2013.01); *F01N 3/0842* (2013.01); *F01N 3/101* (2013.01); *F01N 3/2803* (2013.01); *B01J 21/04* (2013.01); *B01J 2219/32296* (2013.01); *F01N 2330/30* (2013.01); *F01N 2370/02* (2013.01); *F01N 2510/0684* (2013.01); *F01N 2570/14* (2013.01)

(58) Field of Classification Search
CPC ... B01J 23/56; B01J 23/58; B01J 23/63; B01J 35/002; F01N 3/0814; F01N 3/0842; F01N 3/101; F01N 3/2803
USPC ....... 502/304, 328, 332–334, 339, 355, 415, 502/439
See application file for complete search history.

(56) References Cited

U.S. PATENT DOCUMENTS

| | | | | |
|---|---|---|---|---|
| 5,254,519 | A * | 10/1993 | Wan | B01J 37/0244 502/252 |
| 5,462,907 | A * | 10/1995 | Farrauto | B01D 53/944 502/304 |
| 5,490,977 | A * | 2/1996 | Wan | B01J 23/6562 423/247 |
| 5,627,124 | A * | 5/1997 | Farrauto | B01J 37/0244 502/304 |
| 8,950,174 | B2 * | 2/2015 | Hilgendorff | B01J 35/023 60/299 |
| 9,242,242 | B2 * | 1/2016 | Hilgendorff | B01J 37/0248 |
| 9,540,980 | B2 * | 1/2017 | Hilgendorff | B01J 35/1019 |
| 9,610,564 | B2 * | 4/2017 | Xue | B01J 23/63 |
| 9,611,774 | B2 * | 4/2017 | Xue | F01N 3/2066 |
| 9,744,529 | B2 * | 8/2017 | Xue | B01J 21/066 |
| 9,981,258 | B2 * | 5/2018 | Xue | B01J 37/0244 |
| 10,226,754 | B2 * | 3/2019 | Grubert | B01J 37/0248 |
| 10,512,898 | B2 * | 12/2019 | Deeba | B01J 35/0006 |
| 2008/0120970 | A1 | 5/2008 | Hilgendorff et al. | |
| 2014/0260214 | A1 | 9/2014 | Xue et al. | |
| 2020/0070092 | A1 * | 3/2020 | Dorner | B01D 53/9468 |
| 2022/0203339 | A1 * | 6/2022 | Zheng | B01D 53/9477 |
| 2022/0212169 | A1 * | 7/2022 | Vjunov | B01D 53/9477 |
| 2022/0212170 | A1 * | 7/2022 | Sung | B01J 35/0006 |

FOREIGN PATENT DOCUMENTS

| | | |
|---|---|---|
| JP | 2013-146693 A | 8/2013 |
| JP | 2016-517343 A | 6/2016 |
| JP | 2019-124152 A | 7/2019 |

* cited by examiner

LNT LAYERED CATALYST FOR LEAN BURN GASOLINE ENGINE AND EXHAUST GAS PURIFICATION APPARATUS USING THE SAME

This application claims the benefit of JP 2020-033355 filed on Feb. 28, 2020.

BACKGROUND OF THE INVENTION

Field of the Invention

The present invention relates to an LNT layered catalyst for a lean burn gasoline engine with an improved $NO_x$ storage rate and to an exhaust gas purification apparatus using the same.

Description of the Related Art

Emissions of nitrogen oxides ($NO_x$), carbon monoxide (CO), hydrocarbons (HC), and the like from a combustion engine (for example, an engine) used for a passenger car or the like must be reduced so as to meet emission control standards such as Air Pollution Control Act. In an exhaust gas purification system using a conventional three-way catalyst (TWC), these three species of pollutants are simultaneously reduced by operating an engine at or near stoichiometric air-fuel ratio (air/fuel ratio, A/F) conditions while mounting a predetermined three-way catalyst inside an exhaust pipe at the engine outlet.

On the other hand, combustion engines effectively utilizing a small amount of fuel, for example, lean combustion (lean burn)-type gasoline engines and diesel engines have been attracting attention from the viewpoints of preventing recent global warming due to carbon dioxide ($CO_2$) and making efficient use of limited resources. The ratio of air to fuel contained in a combustion mixture supplied to a lean combustion engine is kept significantly beyond the stoichiometric ratio. Therefore, exhaust gas consequently generated becomes lean. That is, the oxygen content becomes relatively high.

While the lean combustion engine provides high fuel efficiency, an amount of air taken into the engine is large relative to the stoichiometric air-fuel ratio. Therefore, advantages and disadvantages different from those of conventional exhaust gas purification are caused. An example of the advantages is that since the amount of air is larger than the stoichiometric amount, HC and CO, which are reductive components, are made easier to be oxidized and purified by excessive oxygen. Meanwhile, an example of the disadvantages is that since the amount of air is larger than the stoichiometric amount, $NO_x$, which is an oxidative component, is made harder to be reduced and purified due to a shortage of reductive components such as HC and CO. In addition, since the amount of air in a lean combustion engine is constantly larger than the stoichiometric amount, $NO_x$ is essentially easily formed; besides, reduction and purification of $NO_x$ are extremely difficult due to the shortage of reductants such as HC and CO. From these reasons, unlike conventional three-way catalyst, a design in which $NO_x$ is ensured to be sufficiently reduced and purified is required as a catalyst for treating exhaust gas generated from lean burn combustion engines.

Lean $NO_x$ trap (LNT) catalysts are studied as a catalyst for reducing and purifying $NO_x$ exhausted from lean combustion engines at high efficiency. In LNT catalysts, components including oxides of alkaline earth metals such as barium, magnesium, calcium, and strontium; oxides of alkali metals such as lithium, sodium, potassium, and rubidium; and oxides of rare earth elements such as cerium, lanthanum, praseodymium, and neodymium are used as $NO_x$ storage material or the like.

In LNT catalysts, precious metal-based active species such as platinum, palladium, and rhodium and promoter components such as ceria, zirconia, and ceria-zirconia-based composite oxides are often used in addition to the above-described $NO_x$ storage catalysts. These promoter components such as ceria and zirconia promote aqueous gas shift reaction and steam reforming reaction during a fuel-rich operation period (rich) to convert CO and HC in exhaust gas into $H_2$. By virtue of the functions of these promoters, $H_2$ obtained from conversion has high $NO_x$ reduction efficiency and therefore, is capable of highly effectively reducing $NO_x$ having been stored in $NO_x$ storage material with a small amount of fuel.

As an example of conventional LNT catalyst technique, a nitrogen oxide storage catalyst having a coating on a support, in which the coating includes a nitrogen oxide storage material including ceria particles carrying an alkaline earth oxide on the particles, the ceria has a microcrystalline size of about 10 to 20 nm, and the alkaline earth metal oxide has a microcrystalline size of about 20 to 40 nm has been suggested (see Japanese Translation of PCT International Application Publication No. 2010-510884).

The present applicant has suggested a denitrification catalyst (LNT) for storing $NO_x$ in exhaust gas, the denitrification catalyst having, on an integral structure-type carrier, a catalyst layer that is composed of at least two layers and includes a precious metal element, in which an upper layer contains a zirconia-based composite oxide (A) carrying rhodium and contains ceria-alumina (C) carrying platinum, barium carbonate, and magnesium carbonate; and a lower layer contains ceria (B) carrying palladium, contains zeolite (D) carrying palladium, and contains ceria-alumina (C') carrying platinum, barium carbonate, and magnesium carbonate (see Japanese Patent Laid-Open No. 2013-146693).

Furthermore, a nitrogen oxide storage catalyst including, on a substrate, a layer including ceria-alumina particles that have a ceria phase present in the composite in the range of about 20% to about 80% by weight on an oxide basis, with the ceria-alumina particles carrying an alkaline earth metal component thereon, wherein the $CeO_2$ is present in the form of crystallites that are hydrothermally stable and have an average crystallite size of less than 130 Å after aging at 950° C. for five hours in 2% $O_2$ and 10% steam in $N_2$ has been suggested (see Japanese Translation of PCT International Application Publication No. 2016-517343).

Then, Japanese Patent Laid-Open No. 2013-053583 and Japanese Patent Laid-Open No. 2019-124152 each disclose an exhaust gas purification apparatus using an LNT catalyst and a control method thereof.

In recent years, higher purification performance is required in consideration of environmental issues. However, according to the findings of the present inventors, it has been found that in the $NO_x$ storage materials used in the Japanese Translation of PCT International Application Publication No. 2010-510884, Japanese Patent Laid-Open No. 2013-146693, and Japanese Translation of PCT International Application Publication No. 2016-517343, $NO_x$ storage amounts thereof depend on the environmental temperature (exhaust gas temperature), and an expected $NO_x$ storage amount is not provided.

Furthermore, according to the findings of the present inventors, it has been found that in the $NO_x$ storage materials used in the Japanese Translation of PCT International Application Publication No. 2010-510884, Japanese Patent Laid-Open No. 2013-146693, and Japanese Translation of PCT International Application Publication No. 2016-517343, the $NO_x$ storage amounts are unexpectedly reduced under a highly lean environment in which an amount of air is relatively large and which is unfavorable for development of catalytic performance.

The present invention has been made in view of the above problems. That is, an object of the present invention is to provide an LNT layered catalyst for a lean burn gasoline engine in which the $NO_x$ storage rate is further enhanced and which is capable of developing a higher $NO_x$ purification rate and to provide an exhaust gas purification apparatus or the like using the same. Furthermore, another object of the present invention is to provide a high performance LNT layered catalyst for a lean burn gasoline engine capable of stably maintaining a high $NO_x$ storage amount and capable of developing a higher $NO_x$ purification rate even under a harsh operating environment in which the amount of air greatly changes and to provide an exhaust gas purification apparatus or the like using the same.

SUMMARY OF THE INVENTION

The present inventors have carried out intensive studies to solve the above problems. As a result, the present inventors have found that the above problems can be solved by controlling a distribution state of a catalytically active component in a catalyst layer and adjusting an amount of a $NO_x$ storage material to be used, and the present invention has been completed thereby.

That is, the present invention provides the following various aspects.

(1) An LNT layered catalyst for a lean burn gasoline engine, including a substrate (11), a first catalyst layer (L1) provided on the substrate, and a second catalyst layer (R1) provided on the first catalyst layer (L1), in which the first catalyst layer (L1) includes ceria-alumina-based base material particles, Pt and Pd supported on the ceria-alumina-based base material particles, and BaO supported on the ceria-alumina-based base material particles; the second catalyst layer (R1) includes ceria-alumina-based base material particles and Pt and Rh supported on the ceria-alumina-based base material particles; and requirements (A) to (D) below are satisfied:

(A) a content of Pt included in the first catalyst layer (L1) is 0.45% to 0.85% by mass, in terms of metal, based on the total solid content of the first catalyst layer (L1), (B) with reference to a boundary plane (B) between the second catalyst layer (R1) and the first catalyst layer (L1), a content proportion of Pt included in a depth region (L1$a$, L1$b$) ranging from the boundary plane (B) to $2/3$ in the thickness direction T of the first catalyst layer (L1) is 88% to 90% by mass based on the total Pt amount included in the first catalyst layer (L1), (C) a content proportion of Pt included in a depth region (L1$c$) ranging from $2/3$ to $3/3$ in the thickness direction T of the first catalyst layer (L1) with reference to the boundary plane (B) is 10% to 12% by mass based on the total Pt amount included in the first catalyst layer (L1), and (D) a content of Ba included in the first catalyst layer (L1) is 4% to 11% by mass, in terms of oxide, based on the total catalyst amount of the first catalyst layer (L1), and the second catalyst layer (R1) is substantially free from Ba.

(2) The LNT layered catalyst for a lean burn gasoline engine according to (1), in which requirements (B1) and (B2) below are further satisfied:

(B1) a content proportion of Pt included in a depth region (L1$a$) ranging from the boundary plane (B) to $1/3$ in the thickness direction T of the first catalyst layer (L1) is 40% to 50% by mass based on the total Pt amount included in the first catalyst layer (L1), and (B2) a content proportion of Pt included in a depth region (L1$b$) ranging from $1/3$ to $2/3$ in the thickness direction T of the first catalyst layer (L1) with reference to the boundary plane (B) is 40% to 50% by mass based on the total Pt amount included in the first catalyst layer (L1).

(3) The LNT layered catalyst for a lean burn gasoline engine according to (1) or (2), in which a ratio (Pt/BaO) between the total Pt amount and the total BaO amount included in the first catalyst layer (L1) is 0.05 to 0.15 in terms of mass.

(4) The LNT layered catalyst for a lean burn gasoline engine according to any one of (1) to (3), in which the substrate (11) is an integral structure-type honeycomb carrier.

(5) The LNT layered catalyst for a lean burn gasoline engine according to (4), in which the substrate (11) is a flow-through-type honeycomb carrier.

(6) The LNT layered catalyst for a lean burn gasoline engine according to (4), in which the substrate (11) is a wall-flow-type honeycomb carrier.

(7) The LNT layered catalyst for a lean burn gasoline engine according to any one of (1) to (6), in which the first catalyst layer (L1) further has an alkaline earth metal salt other than BaO.

(8) The LNT layered catalyst for a lean burn gasoline engine according to any one of (1) to (7), in which the second catalyst layer (R1) contains substantially no alkaline earth metal salt.

(9) An exhaust gas purification apparatus, comprising: a three-way catalyst disposed downstream of an exhaust gas flow passage of a lean combustion engine; and the LNT layered catalyst for a lean burn gasoline engine according to any one of (1) to (8) disposed downstream of the three-way catalyst.

(10) An exhaust gas purification apparatus, comprising: a three-way catalyst disposed downstream of an exhaust gas flow passage of a lean combustion engine; a first LNT layered catalyst for a lean burn gasoline engine according to any one of (1) to (8) disposed downstream of the three-way catalyst; and a second LNT layered catalyst for a lean burn gasoline engine according to any one of (1) to (8) disposed downstream of the first LNT layered catalyst for a lean burn gasoline engine.

According to the present invention, an LNT layered catalyst for a lean burn gasoline engine in which the $NO_x$ storage rate is further enhanced and which is capable of developing a higher $NO_x$ purification rate and an exhaust gas purification apparatus or the like using the same can be realized. In addition, according to the present invention, a high performance LNT layered catalyst for a lean burn gasoline engine capable of stably maintaining a high $NO_x$ storage amount and capable of developing a higher $NO_x$ purification rate even under a harsh operating environment in which the amount of air greatly changes and an exhaust gas purification apparatus or the like using the same can be realized. Accordingly, the present invention enables improvement in performance of lean burn gasoline engines which effectively utilize a small amount of fuel and can promote their dissemination.

DETAILED DESCRIPTION OF THE PREFERRED EMBODIMENT

Hereinafter, an embodiment of the present invention will be described in detail with reference to drawings. Positional relations such as left, right, top, bottom, and the like are based on the positional relations illustrated in the drawings unless otherwise noted. The dimension scales in the drawings are also not limited to the scales illustrated in the drawings. It is noted that the following embodiment is illustrative for describing the present invention, and the present invention is not limited thereto. That is, the present invention can be arbitrarily modified and carried out without departing from the spirit thereof. In the present specification, descriptions relating to a numerical range such as "1 to 100" include both the upper limit "100" and lower limit "1" thereof. The same applies to description of other numerical ranges. The "D90 particle diameter" herein refers to a particle diameter at which an accumulated value from the smallest particle diameter reaches 90% of the total in a volume-based particle diameter cumulative distribution and refers to a value measured by a laser diffraction type particle size distribution measuring apparatus (for example, laser diffraction type particle size distribution measuring apparatus SALD-3100, manufactured by SHIMADZU CORPORATION). A BET specific surface area refers to a value obtained by the single-point BET method using a specific surface area/pore distribution measuring apparatus (trade name: BELSORP-mini II, manufactured by MicrotracBEL Corp.) and analysis software (trade name: BEL_Master, manufactured by MicrotracBEL Corp.).

<LNT Layered Catalyst 100>

Figure 1:
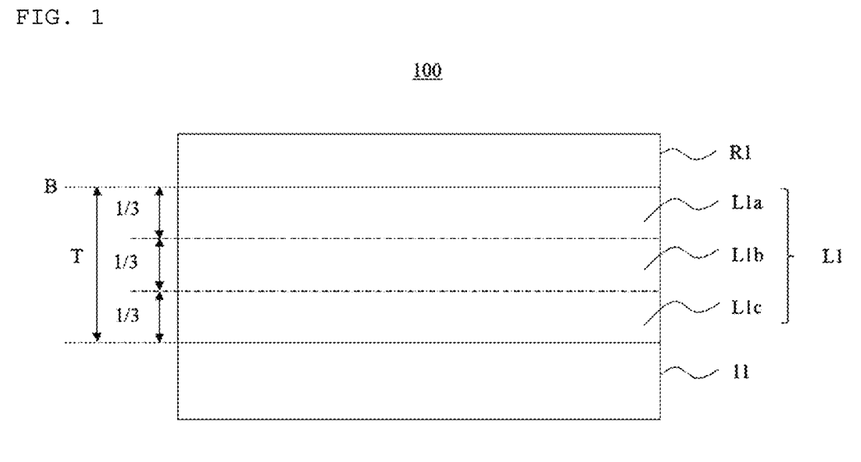
FIG. 1 is a cross sectional view illustrating a schematic configuration of one embodiment of an LNT layered catalyst 100.

FIG. 1 is a schematic diagram illustrating a schematic configuration of one embodiment of an LNT layered catalyst 100 of the present invention. The LNT layered catalyst 100 of the present embodiment is a lean $NO_x$ trap (LNT) catalyst for purifying exhaust gas emitted from a lean burn gasoline engine, especially for purifying nitrogen oxides ($NO_x$). This LNT layered catalyst 100 allows a $NO_x$ storage material ($NO_x$ adsorbent) to temporally store (adsorb) a $NO_x$ component during a lean (oxygen rich) operation period and release the stored $NO_x$ during a rich (fuel rich) operation period, and the $NO_x$ storage material or the like promotes, during a rich (or stoichiometric) operation period, reduction of $NO_x$ to nitrogen through reaction or the like of $NO_x$ (including $NO_x$, released from the $NO_x$ storage material or the like) with HC, CO, and/or hydrogen existing in exhaust gas.

The LNT layered catalyst 100 of the present embodiment includes a substrate 11, a first catalyst layer L1 provided on the substrate 11, and a second catalyst layer R1 provided on the first catalyst layer L1. The first catalyst layer L1 has a thickness T and has three regions including depth regions L1a, L1b, and L1c each corresponding to ⅓ of the thickness T in the direction from the top to the bottom shown in the drawing with reference to a boundary plane B between the second catalyst layer R1 and the first catalyst layer L1.

In the present embodiment, description is made such that a single first catalyst layer L1 is divided into three depth regions of L1a, L1b, and L1c. However, each of the depth regions L1a, L1b, and L1c may form an inseparable integral single layer, or the depth regions L1a, L1b, and L1c may form a layered structure. In the latter case, the first catalyst layer L1 may have a multilayer structure of two or three or more layers. For example, when a first catalyst layer L1 having a single layer structure is configured, catalyst slurry may be applied so that Pt is unevenly distributed with the above-described proportions, at the time of forming the first catalyst layer L1. When a first catalyst layer L1 with two layers is configured, catalyst slurry for the depth region L1c and catalyst slurry for the depth regions L1a and L1b may be prepared, and each layer may be formed by applying them in turn on the substrate 11. When a first catalyst layer L1 with a three-layer structure is configured, catalyst slurry for the depth region L1c, catalyst slurry for the depth region L1b, and catalyst slurry for the depth region L1a may be prepared, and each layer may be formed by applying them in turn on the substrate 11. At this time, catalyst slurry with different Pt concentrations can be used, an applying amount of catalyst slurry can be adjusted, and catalyst slurry can be applied several times.

In dividing the first catalyst layer L1 into the depth regions L1a, L1b, and L1c, measurement is carried out at the part at which the surface to be coated of the substrate 11 has a flat plane so that, with reference to the boundary plane B between the second catalyst layer R1 and the first catalyst layer L1, the thickness is equally divided into three regions in the thickness T direction from the boundary plane B, as shown in FIG. 1. When an integral structure-type honeycomb carrier or the like is used as the substrate 11, the surface to be coated of the substrate 11 may not be composed of a flat plane only. Specifically, when the cross-section of a cell has a rectangular shape, for example, catalyst slurry is applied to the inner perimeter (that is, four corners (corner parts) of the rectangle and four sides (straight parts) connecting the four corners) of each cell. However, in such a case, since catalyst slurry is likely to deposit on the four corners (corner parts) of each cell, the thickness T of the first catalyst layer L1 at the periphery of the four corners (corner parts) of each cell may be significantly different from the thickness at the four sides (straight parts) connecting the four corners. Therefore, in the measurement for the division of the first catalyst layer L1 into the depth regions L1a, L1b, and L1c, respective thicknesses of the periphery of the four corners (corner parts) and of a flat plane (straight part) equidistant from the four corners (corner parts) of each cell are measured and averaged. Hereinafter, each configuration will be described in detail.

(Substrate 11)

The substrate 11 is a catalyst carrier supporting the first catalyst layer L1 and the second catalyst layer R1, and an integral structure-type honeycomb carrier which is generally used for automobile emission application is preferably used, for example. The integral structure-type honeycomb carrier has plural through-holes extending from one end face to the other end face, and the through-holes gather to form a honeycomb shape. Examples of such an integral structure-type honeycomb carrier include a ceramic monolithic carrier of cordierite, cordierite alumina, silicon carbide nitride, silicon carbide, silicon nitride, or the like; a metal honeycomb carrier of stainless steel or the like; a wire mesh carrier of stainless steel or the like; and a steel wool-like knitted wire carrier. The shape of the integral structure-type honeycomb carrier is not limited, and any shape such as a prism shape, a cylindrical shape, a spherical shape, a honeycomb shape, and a sheet-like shape can be selected, for example. One kind thereof may be employed alone or two or more kinds thereof may be appropriately employed in combination.

A flow-through-type honeycomb carrier having a structure that has plural through-hole (gas flow passages) opening from one open end face toward the other open end face, and a wall-flow-type honeycomb carrier in which one open end face and the other open end face are alternately sealed and gas can flow through a porous wall are widely known as the integral structure-type honeycomb carrier. Both of them are applicable. The flow-through-type honeycomb carrier is widely used for an oxidation catalyst, a reduction catalyst, a three-way catalyst (TWC), and the like. The wall-flow-type honeycomb carrier serves as a filter for filtering solid components and particulate components such as soot and SOF in exhaust gas and is widely used as a diesel particulate filter (DPF), a gasoline particulate filter (GPF), and the like. Among them, a flow-through-type honeycomb carrier with small air resistance and low pressure loss of exhaust gas is preferable.

While the size of the substrate 11 such as the integral structure-type honeycomb carrier can be appropriately set according to application and performance requirements and is not limited, one having a diameter (length) of several millimeters to several centimeters can be used, for example. The number of pores of the opening of the substrate 11 such as the integral structure-type honeycomb carrier is also appropriately set, considering the type of exhaust gas to be treated, gas flow rate, pressure loss or purification efficiency, and the like. While the cell density of the substrate 11 such as the integral structure-type honeycomb carrier is not limited, the cell density is preferably 100 to 150 cell/inch$^2$ (155 k/m$^2$ to 2325 k/m$^2$), especially preferably 200 to 900 cell/inch$^2$ (310 k/m$^2$ to 1400 k/m$^2$), and more preferably 300 to 600 cell/inch$^2$ (465 k/m$^2$ to 933 k/m$^2$) from the viewpoints of keeping the contact area (surface area) of the catalyst against a gas flow high while maintaining strength, suppressing an increase of pressure loss, and the like. The cell density refers to the number of cells per unit area in the cross-section obtained by cutting, at right angle with the gas flow passages, the substrate 11 such as the integral structure-type honeycomb carrier.

(First Catalyst Layer L1)

The first catalyst layer L1 includes ceria-alumina-based base material particles, Pt and Pd which are precious metal active species supported on the ceria-alumina-based base material particles, and BaO which is a NO$_x$ storage material supported on the ceria-alumina-based base material particles or a precursor thereof (hereinafter, sometimes simply referred to as the "NO$_x$ storage material"). Catalytic activity of the precious metal active species greatly depends on their surface area magnitudes, and the precious metal active species are desirably stably dispersed in a catalyst composition in a particulate state. Therefore, in the present embodiment, Pt and Pd, which are precious metal active species, and BaO are supported, in a highly dispersed state, on the ceria-alumina-based base material particles in which the base material particles themselves are a heat-resistant inorganic oxide having a large surface area so that the highly dispersed state is stably kept even at a high temperature. Consequently, aggregation of particles on the surfaces of the ceria-alumina-based base material particles and particle growth associated therewith are suppressed to suppress a decrease in catalytic activity at a high temperature. Incidentally, as Ba on the surfaces of the ceria-alumina-based base material particles is exposed to high temperature and oxidized during firing performed in a manufacturing step and during exhaust gas purification process described later, Ba is represented as its oxide, BaO; however, Ba may be in a state of various salts such as a nitrate, carbonate, and acetate in response to external environment.

The ceria-alumina-based base material particles used herein are carrier particles carrying Pt and Pd, which are precious metal active species, and BaO on their surfaces and are a composite (CeO$_2$/Al$_2$O$_3$) of oxides containing ceria and alumina which have functions of promoting aqueous gas shift reaction, storing NO$_x$, and the like. The content proportion of ceria in the ceria-alumina-based base material particles is not limited but is preferably 20% to 80% by mass, more preferably 30% to 70% by mass, and still more preferably 40% to 60% by mass in terms of oxide. One kind of the ceria-alumina-based base material particles can be used alone, or two or more kinds thereof can be used in combination.

The ceria-alumina-based base material particles used herein are preferably composite particles in which ceria is supported on alumina in a highly dispersed state so as to exert the NO$_x$ storage function in a greater degree. In addition, it is preferable that at least a part of ceria forms solid solution with alumina so as to prevent ceria from binding to adjacent ceria on alumina to cause particle growth at a high temperature. The term alumina herein is a concept encompassing aluminum hydroxide oxides such as boehmite [α-AlO(OH)] and diaspore [β-AlO(OH)], hydrated alumina Al$_2$O$_3$.n(H$_2$O), or the like in addition to aluminum oxide such as γ-alumina, δ-alumina, θ-alumina, and α-alumina, and the kinds thereof are not limited. One kind of alumina can be used alone, or two or more kinds thereof can be used in any combination at any ratio. Among them, γ-alumina, δ-alumina, θ-alumina, and boehmite which have large surface areas are preferable as alumina. Especially, although durability of γ-alumina at 1000° C. or higher is inferior to other kinds of alumina, γ-alumina has sufficient heat resistance as the LNT catalyst, which is usually used at 1000° C. or lower, and has the largest surface area among all kinds of alumina; therefore, γ-alumina is particularly preferable.

A BET specific surface area of the ceria-alumina-based base material particles is not limited but is preferably 50 to 250 m$^2$/g and more preferably 100 to 200 m$^2$/g from the viewpoints of keeping a high surface area as base material particles and stably carrying the precious metal active species and the NO$_x$ storage material in a highly dispersed state.

Preferable ceria-alumina-based base material particles have a ceria phase in a rage of 20% to 80% by mass in terms of oxide and are present in a form of crystallites having an average crystallite size of less than 130 Å after aging at 950° C. for five hours in 2% O$_2$ and 10% steam in N$_2$ and having hydrothermal stability, for example. Such ceria-alumina-based base material particles exhibit improved NO$_x$ trapping capability during lean operation, exhibit improved NO$_x$ reduction performance during rich reproduction, and are described in, for example, Japanese Translation of PCT International Application Publication No. 2016-517343, the contents of which are incorporated herein by reference.

One kind of the ceria-alumina-based base material particles can be used alone, or two or more kinds thereof can be used in combination. When two or more kinds of the ceria-alumina-based base material particles are used, those with different ceria content ratios or different alumina contents can be used.

While an average particle diameter of the ceria-alumina-based base material particles can be appropriately set according to desired properties and is not limited, a D90 particle diameter is preferably 1 to 30 µm, more preferably 3 to 25 µm, and still more preferably 7 to 20 µm.

While an applying amount of the ceria-alumina-based base material particles in the first catalyst layer L1 (depth regions L1a, L1b, and L1c) can be appropriately set according to desired properties and is not limited, the applying amount is preferably 100 to 400 g/L and more preferably 150 to 350 g/L per unit volume of the substrate 11 in total in terms of the solid content of the ceria-alumina-based base material particles from the viewpoints of functioning as a promoter or $NO_x$ storage, and the like.

As described above, it is sufficient that the base material particles included in the first catalyst layer L1 include ceria-alumina-based base material particles carrying Pt and Pd and further carrying BaO, base material particles other than the ceria-alumina-based base material particles (hereinafter, sometimes referred to as the "other base material particles") may be included therein. Those known in the art can be used as the other base material particles, and the kinds thereof are not limited. Examples thereof include oxides such as aluminum oxide (alumina: $Al_2O_3$) including γ-alumina, β-alumina, δ-alumina, η-alumina, and θ-alumina, silica-alumina, cerium oxide (ceria: $CeO_2$), zirconium oxide (zirconia: $ZrO_2$), ceria-zirconia-based composite oxide (CZ composite oxide: $CeO_2/ZrO_2$), silicon oxide (silica: $SiO_2$), and titanium oxide (titania: $TiO_2$), and composite oxides containing the above-described oxides as their main components, but are not limited thereto. The other base material particles may be a composite oxide or solid solution to which any of a rare earth element such as lanthanum and yttrium, a transition metal element, and an alkaline earth metal element is added. In addition, β-type zeolite, MFI-type zeolite, other zeolites such as A, X, Y, MOR, CHA, and SAPO, and analogs thereof can also be used as the other base material particles.

One kind of these other base material particles can be used alone, or two or more kinds thereof can be used in any combination and at any ratio. Above-described Pt, Pd, and BaO may be partly supported on these other base material particles. Furthermore, another component such as an alkali metal element including potassium and sodium, a transition element including iron, cobalt, nickel, and titanium, a rare earth element including lanthanum, neodymium, zirconium, and praseodymium, or an oxide thereof may be contained as an additive so as to suppress a decrease in the BET specific surface area caused at a high temperature, for example.

Pt and Pd are essential as the precious metal active species in the first catalyst layer L1. Pt and Pd are mainly used as precious metal active species for oxidizing and purifying HC, CO, and the like in exhaust gas or oxidizing and converting $NO_x$ during a lean operation period, and for reducing and purifying $NO_x$ during a rich operation period. The first catalyst layer L1 may include a catalytically active species other than Pt and Pd (hereinafter, sometimes referred to as the "other catalytically active species"). Examples of the other catalytically active species include platinum group elements such as iridium (Ir), ruthenium (Ru), and osmium (Os); precious metal elements such as gold (Au) and silver (Ag); transition metal elements such as iron (Fe), copper (Cu), nickel (Ni), cobalt (Co), zirconium (Zr), and tungsten (W); and rare earth elements such as lanthanum (La), praseodymium (Pr), and neodymium (Nd), but are not limited thereto.

While a total content of Pt in the first catalyst layer L1 can be appropriately set according to desired properties and is not limited, the total content of Pt is preferably 0.45% to 0.85% by mass, more preferably 0.50% to 0.80% by mass, and still more preferably 0.55% to 0.75% by mass in terms of metal (Pt) based on the total solid content of the first catalyst layer L1 from the viewpoint of balance between oxidation reaction and reduction reaction.

While a total content of Pd in the first catalyst layer L1 can be appropriately set according to desired properties and is not limited, the total content of Pd is preferably 0.01% to 0.27% by mass, more preferably 0.03% to 0.23% by mass, and still more preferably 0.06% to 0.20% by mass in terms of metal (Pd) based on the total solid content of the first catalyst layer L1 from the viewpoint of balance between oxidation reaction and reduction reaction.

A content ratio between Pt and Pd in the first catalyst layer L1 can be appropriately set according to desired properties and is not limited. The content ratio (Pt/Pd) between Pt and Pd is preferably 3:1 to 30:1 and more preferably 5:1 to 20:1 by mass ratio calculated as metal from the viewpoints of oxidation of high boiling point HC, sulfur resistance, and the like. Incidentally, Pt, Pd and the other catalytically active species in the first catalyst layer L1 preferably exist as metal (in their metallic states). However, a part thereof may be oxidized during firing performed in a manufacturing step and during exhaust gas purification process described later to form oxides.

The LNT layered catalyst 100 of the present embodiment herein is a multilayered catalyst having a layer structure of the first catalyst layer L1 and the second catalyst layer R1. In such a multilayered catalyst, the upper layer side has more chances to contact with harmful gas such as HC, CO, and $NO_x$ in exhaust gas than the lower layer side. Therefore, the upper layer side tends to provide higher purification activity than the lower layer side. On the other hand, the upper layer side is directly exposed to exhaust gas having a high temperature, and the temperature of the upper layer side is likely to be high locally due to heat generated during oxidation-reduction reaction; therefore, sintering and particle growth of the base material, precious metal components, promotor component, and the like are more likely to occur at the upper layer side than the lower layer side. Furthermore, catalyst poisoning substances typified by sulfur components are mixed into exhaust gas and flow into the catalyst to attach to the upper layer side first. Consequently, the upper layer side is likely to be affected by these poisoning substances, causing catalytic performance deterioration. In other words, since most of the poisoning substances attach to and are trapped by the upper layer side, the poisoning substances are relatively less likely to diffuse toward the lower layer side, and an amount of the poisoning substances reaching the lower layer side is relatively small. Therefore, catalytic performance deterioration due to poisoning substances is suppressed by placing Pd, which has relatively poor sulfur resistance, in the first catalyst layer L1 located at the lower layer side. Consequently, a certain HC species (high boiling point HC) which is hardly addressed by Pt and the like can be sufficiently oxidized and purified. In addition, heat resistance of Pt can be improved by placing Pd, which has higher heat resistance than Pt, in the first catalyst layer L1. As a result, exhaust gas purification performance of the LNT layered catalyst 100 can be enhanced by such a multilayered catalyst including the first catalyst layer L1 and the second catalyst layer R1.

Furthermore, in the LNT layered catalyst 100 of the present embodiment, the first catalyst layer L1 itself also has a characteristic configuration so as to function as a multi-layered catalyst. That is, when the boundary plane B is divided into the depth regions L1a, L1b, and L1c in the thickness T direction by ⅓ with reference to the boundary plane B between the second catalyst layer R1 and the first catalyst layer L1, Pt included in the first catalyst layer L1 is allocated so that the amount of Pt is larger in the upper depth regions L1a and L1b than the lower depth region L1c.

Specifically, based on the total Pt amount included in the first catalyst layer L1, the content proportion of Pt included in the depth regions L1a and L1b is 88% to 90% by mass, and the content proportion of Pt included in the depth region L1c is 10% to 12% by mass. In this manner, by virtue of unevenly distributing the existence ratio of Pt in the first catalyst layer L1 not to the depth region L1c side but to the upper depth regions L1a and L1b where Pt has more chances to contact with exhaust gas, is likely to be exposed to high temperature, and has more chances to contact with poisoning substances, a function as a multilayered catalyst is also imparted to the first catalyst layer L1; thereby, purification performance against exhaust gas is enhanced while suppressing an increase in the costs of the first catalyst layer L1. In a typical aspect, the content proportion of Pt included in the depth region L1a is preferably 40% to 50% by mass and more preferably 42% to 48% by mass based on the total Pt amount included in the first catalyst layer L1, and the content proportion of Pt included in the depth region L1b is preferably 40% to 50% by mass and more preferably 42% to 48% by mass based on the total Pt amount included in the first catalyst layer L1.

On the other hand, the Ba component, which is a $NO_x$ storage material included in the first catalyst layer L1, stores $NO_x$ as barium nitrate under a high oxygen (lean) condition and, in a low oxygen (rich) condition, releases the stored $NO_x$ when barium nitrate changes into barium carbonate. $NO_x$ released in this manner is purified, utilizing HC and CO, which are reductants, or hydrogen and the like generated through steam reforming reaction, through catalytic reaction caused by a catalytically active species such as Rh. In the present embodiment, BaO is supported on the ceria-alumina-based base material particles described above. BaO is supported on the ceria-alumina-based base material particles so as to allow barium carbonate and magnesium carbonate to quickly adsorb $NO_2$ generated by oxidation of NO through synergetic effect of platinum and ceria (ceria promotes NO oxidation activity of platinum). Incidentally, a part of BaO may be supported on the other base material particles other than the ceria-alumina-based base material particles.

The content proportion of BaO in the first catalyst layer L1 is preferably 4% to 11% by mass and more preferably 4% to 10% by mass in terms of oxide (BaO) based on the total amount of the first catalyst layer L1. In conventional LNT catalysts, a large amount of BaO is mixed from the viewpoint of enhancing $NO_x$ storage properties and improving $NO_x$ purification performance. Meanwhile, in an aspect in which the multilayered catalyst of the present embodiment is combined, $NO_x$ storage properties and $NO_x$ purification performance higher than those of conventional LNT catalysts is obtained while the use amount of BaO is about ½ to ¼ of conventional use amounts.

While it is sufficient that the $NO_x$ storage material included in the first catalyst layer L1 includes BaO described above, a known $NO_x$ storage material or a precursor thereof other than BaO (hereinafter, sometimes referred to as the "other $NO_x$ storage material") may be further included. Any material known in the art can be used as the other $NO_x$ storage material, and the kinds thereof are not limited. Examples thereof include salts of alkaline earth metal such as beryllium (Be), magnesium (Mg), calcium (Ca), and strontium (Sr). A content proportion of an alkaline earth metal salt other than BaO in the first catalyst layer L1 is preferably 1% to 30% by mass, more preferably 2% to 20% by mass, and still more preferably 2% to 15% by mass based on the total amount of the first catalyst layer L1 in terms of oxide (BeO, MgO, CaO, SrO).

While a use ratio of BaO to Pt in the first catalyst layer L1 may be appropriately set according to desired properties and is not limited, the ratio (Pt/BaO) between the total Pt amount and the total BaO amount included in the first catalyst layer L1 is preferably 0.05 to 0.15 and more preferably 0.06 to 0.15 in terms of mass from the viewpoint of obtaining high purification performance while suppressing an increase of the total cost.

In order to prevent activity deterioration due to a decrease in surface areas caused when Pt and Pd particles supported on surfaces of the ceria-alumina-based base material particles in the first catalyst layer L1 aggregate at a high temperature to cause particles to grow, Pt and Pd particles can be surrounded by fine particles to decrease chances for Pt and Pd particles to contact with each other. Examples of such fine particles include alumina other than ceria-alumina, zirconia, silica, silica-alumina, zeolite, titania, tungsten oxide, lanthanum oxide, neodymium oxide, and praseodymium oxide, but are not limited thereto. It is preferable that the fine particles used herein have high heat resistance and are sintered in advance, so as to prevent the fine particles themselves from moving on the ceria-alumina-based base material particles at a high temperature. From said viewpoints, rare earth (composite) oxides (rare earth oxides and rare earth composite oxides) and transition metal oxides are preferable as the fine particles. One kind thereof can be used alone, or two or more kinds thereof can be used in any combination. While a use amount of such fine particles used for preventing aggregation may be appropriately set according to use amounts of Pt and Pd and is not limited, the use amount of the fine particles is preferably 20% to 300% by mass and more preferably 20% to 150% by mass based on the total amount of Pt and Pd.

Since the first catalyst layer L1 adheres to the substrate 11 or the second catalyst layer R1 with sufficient adhesion strength under the use conditions shown in the present embodiment, no binder is needed; however, a binder component known in the art may be contained in the first catalyst layer L1 as needed. Examples of the binder component include various kinds of sol such as alumina sol, titania sol, silica sol, and zirconia sol, but are not limited thereto. In addition, soluble salts such as aluminum nitrate, aluminum acetate, titanium nitrate, titanium acetate, zirconium nitrate, and zirconium acetate can also be used as a binder. Besides, acids such as acetic acid, nitric acid, hydrochloric acid, and sulfuric acid can also be used as a binder. A use amount of the binder is not limited and may be an amount providing sufficient adhesion strength.

(Second Catalyst Layer R1)

The second catalyst layer R1 includes ceria-alumina-based base material particles and Pt and Rh which are precious metal active species supported on the ceria-alumina-based base material particles. Catalytic activity of the precious metal active species greatly depends on their surface area magnitudes, and the precious metal active species are desirably stably dispersed in a catalyst composition in a particulate state. Therefore, in the present embodiment, Pt and Rh, which are precious metal active species, are supported, in a highly dispersed state, on the ceria-alumina-based base material particles in which the base material particles themselves are a heat-resistant inorganic oxide having a large surface area so that the highly dispersed state is stably kept even at a high temperature. Consequently, aggregation of particles on the surfaces of the ceria-alumina-based base material particles and particle growth associated therewith are suppressed to suppress a decrease in catalytic activity at a high temperature.

The ceria-alumina-based base material particles used herein are carrier particles carrying Pt and Rh, which are precious metal active species, on their surfaces and are a composite ($CeO_2/Al_2O_3$) containing ceria and alumina which have functions of promoting aqueous gas shift reaction, storing $NO_R$, and the like. The content proportion of ceria in the ceria-alumina-based base material particles is not limited but is preferably 20% to 80% by mass, more preferably 30% to 70% by mass, and still more preferably 40% to 60% by mass in terms of oxide from the viewpoint of developing an excellent OSC function. One kind of the ceria-alumina-based base material particles can be used alone, or two or more kinds thereof can be used in combination. Those described above for the first catalyst layer L1 can be similarly preferably used as the ceria-alumina-based base material particles used herein, and duplicate description will be omitted. Pt and Rh are supported on the ceria-alumina-based base material particles so that Rh is stabilized by Pt to exert more effective $NO_x$ reduction capability, and purification of $NO_x$ at the time of executing rich spike can be promoted.

While an applying amount of the ceria-alumina-based base material particles in the second catalyst layer R1 can be appropriately set according to desired properties and is not limited, the applying amount is preferably 10 to 90 g/L and more preferably 20 to 70 g/L in total per unit volume of the substrate 11 in terms of solid content of the ceria-alumina-based base material particles from the viewpoints of functioning as a promoter or oxygen storage and release material, and the like.

As described above, it is sufficient that the base material particles included in the second catalyst layer R1 include ceria-alumina-based base material particles carrying Pt and Rh, base material particles other than the ceria-alumina-based base material particles (hereinafter, sometimes referred to as the "other base material particles") may be included therein. Those known in the art can be used as the other base material particles, and the kinds thereof are not limited. For example, those described above for the first catalyst layer L1 can be similarly preferably used, and duplicate description will be omitted.

Pt and Rh are essential as the precious metal active species for the second catalyst layer R1. Pt and Rh are mainly used as precious metal active species for reducing and purifying $NO_x$ with reductive components such as HC and CO. However, since reactivity of $O_2$ oxidizing and purifying HC, CO, and the like is superior to reactivity of Pt and Pd, Rh, which is an active species having high activity, is especially important for reducing and purifying $NO_x$ and reactive HC components. The second catalyst layer R1 may include a catalytically active species other than Pt and Rh (hereinafter, sometimes referred to as the "other catalytically active species"). However, since Pd has relatively poor sulfur resistance, a species other than Pd is preferably used. That is, examples of the other catalytically active species in the second catalyst layer R1 include platinum group elements such as iridium (Ir), ruthenium (Ru), and osmium (Os); precious metal elements such as gold (Au) and silver (Ag); transition metal elements such as iron (Fe), copper (Cu), nickel (Ni), cobalt (Co), zirconium (Zr), and tungsten (W), and rare earth elements such as lanthanum (La), praseodymium (Pr), and neodymium (Nd), but are not limited thereto.

While a total content of Pt in the second catalyst layer R1 can be appropriately set according to desired properties and is not limited, the total content of Pt is preferably 0.23% to 2.70% by mass, more preferably 0.45% to 2.25% by mass, and still more preferably 0.68% to 1.80% by mass in terms of metal (Pt) based on the total solid content of the second catalyst layer R1 from the viewpoint of balance between oxidation reaction and reduction reaction.

While a total content of Rh in the second catalyst layer R1 can be appropriately set according to desired properties and is not limited, the total content of Rh is preferably 0.02% to 6.75% by mass, more preferably 0.11% to 2.25% by mass, and still more preferably 0.23% to 1.13% by mass in terms of metal (Rh) based on the total solid content of the second catalyst layer R1 from the viewpoint of balance between oxidation reaction and reduction reaction.

A content ratio between Pt and Rh in the second catalyst layer R1 can be appropriately set according to desired properties and is not limited. The content ratio between Pt and Rh (Pt/Rh) is preferably 2:1 to 10:1 and more preferably 3:1 to 8:1 by mass ratio calculated as metal from the viewpoints of storage of $NO_N$, reduction of $NO_x$, and the like. Incidentally, Pt, Rh, and the other catalytically active species in the second catalyst layer R1 are preferably present as metal (in their metallic states). However, a part thereof may be oxidized during firing performed in a manufacturing step and during exhaust gas purification process described later to form oxides.

On the other hand, it is desired that, unlike the first catalyst layer L1, the second catalyst layer R1 is substantially free from Ba. This is because, as described above, when the second catalyst layer R1 contains Ba, although the multilayered catalyst of the first catalyst layer L1 and the second catalyst layer R1 is configured with functions of respective layers being separated, redox reaction of Rh is inhibited, and expected $NO_x$ reduction performance is not efficiently obtained. In the present specification, the phrase "substantially free from" means that the content of Ba contained in the second catalyst layer R1 is less than 1% by mass in terms of oxide (BaO) based on the total amount of the second catalyst layer R1. In a more preferable aspect, since no Ba component is intentionally added to the second catalyst layer R1, no Ba exists in the second catalyst layer R1 at all (0% by mass in terms of oxide). However, a person skilled in the art would easily understand that Ba might be mixed into the second catalyst layer R1 from the first catalyst layer L1 containing Ba in or after forming the second catalyst layer R1 or in using the LNT layered catalyst at a high load. From said viewpoints, the content of Ba contained in the second catalyst layer R1 is preferably less than 0.5% by mass and more preferably less than 0.1% by mass in terms of oxide (BaO) based on the total amount of the second catalyst layer R1.

It is also desired that the second catalyst layer R1 is substantially free from other $NO_x$ storage materials other than BaO described above for the same reason. From said viewpoint, a content proportion of alkaline earth metal salts other than BaO in the second catalyst layer R1 is preferably less than 5% by mass in total, more preferably less than 3% by mass in total, still more preferably 1% or less by mass in total, and particularly preferably less than 1% by mass in total in terms of oxide (BeO, MgO, CaO, SrO) based on the total amount of the second catalyst layer R1. Incidentally, these alkaline earth metal salts are calculated as oxides such as BaO, MgO, and the like because they are oxidized during firing performed in a manufacturing step and during exhaust gas purification process described later; however, the alkaline earth metal may form various salts such as nitrates, carbonates, and acetates.

In order to prevent activity deterioration due to a decrease in surface areas caused when Pt and Ph particles supported on surfaces of the ceria-alumina-based base material particles in the second catalyst layer R1 aggregate at a high temperature to cause particles to grow, Pt and Ph particles can be surrounded by fine particles to decrease chances for Pt and Ph particles to contact with each other. Examples of such fine particles include alumina other than ceria-alumina, zirconia, silica, silica-alumina, zeolite, titania, tungsten oxide, lanthanum oxide, neodymium oxide, and praseodymium oxide, but are not limited thereto. It is preferable that the fine particles used herein have high heat resistance and are sintered in advance, so as to prevent the fine particles themselves from moving on the ceria-alumina-based base material particles at a high temperature. From said viewpoints, rare earth (composite) oxides (rare earth oxides and rare earth composite oxides) and transition metal oxides are preferable as the fine particles. One kind thereof can be used alone, or two or more kinds thereof can be used in any combination. While a use amount of such fine particles used for preventing aggregation may be appropriately set according to use amounts of Pt and Ph and is not limited, the use amount of the fine particles is preferably 20% to 300% by mass and more preferably 20% to 150% by mass based on the total amount of Pt and Ph.

Since the second catalyst layer R1 adheres to the first catalyst layer L1 with sufficient adhesion strength under the use conditions shown in the present embodiment, no binder is needed; however, a binder component known in the art may be contained in the second catalyst layer R1 as needed. Examples of the binder component include various kinds of sol such as alumina sol, titania sol, silica sol, and zirconia sol, but are not limited thereto. In addition, soluble salts such as aluminum nitrate, aluminum acetate, titanium nitrate, titanium acetate, zirconium nitrate, and zirconium acetate can be also used as a binder. Besides, acids such as acetic acid, nitric acid, hydrochloric acid, and sulfuric acid can also be used as a binder. A use amount of the binder is not limited and may be an amount providing sufficient adhesion strength.

While a total applying amount of the first catalyst layer L1 and the second catalyst layer R1 on the substrate 11 can be appropriately set according to desired properties and is not limited, the applying amount is preferably 100 to 550 g/L and more preferably 150 to 500 g/L in total per unit volume of the substrate 11 from the viewpoints of obtaining an excellent $NO_x$ storage rate and an excellent $NO_x$ purification rate with sufficient durability while suppressing an increase of pressure loss.

The LNT layered catalyst 100 of the present embodiment has the first catalyst layer L1 and the second catalyst layer R1 as minimum catalyst composition constituent units, and such a layer configuration is desirable not only for operation efficiency but also for costs. Then, as described above, within the spirit of the present invention, a four-layer configuration of a catalyst layer L1a, a catalyst layer L1b, a catalyst layer L1c, and a second catalyst layer R1; a three-layer configuration of a catalyst layer L1a, L1b, a catalyst layer L1c, and a second catalyst layer R1; and a two-layer configuration of a first catalyst layer L1 (L1a, L1b, and L1c) and a second catalyst layer R1 can be employed. Furthermore, a binder layer, a suppressing layer for suppressing migration of catalyst components, a coating layer, an additional catalyst composition layer, and the like may be appropriately provided between these catalyst layers, between the substrate 11 and the first catalyst layer L1 (catalyst layer L1c), or above the second catalyst layer R2. Furthermore, the first catalyst layer L1 (catalyst layers L1a, L1b, and L1c) and the second catalyst layer R1 may coat only a part of the substrate 11 (zone-coating).

<Preparation of LNT Layered Catalyst 100>

The LNT layered catalyst 100 of the present embodiment can be manufactured by any method known in the art, and the manufacturing method thereof is not limited. For example, the LNT layered catalyst 100 of the present embodiment can be obtained by applying catalyst slurry for the first catalyst layer L1 on the substrate 11 by a coating method known in the art followed by, as needed, drying, firing, and the like to form the first catalyst layer L1, then similarly applying catalyst slurry for the second catalyst layer R1 on the first catalyst layer L1 followed by, as needed, drying, firing, and the like to the second catalyst layer R1. From the viewpoint of industrial productivity, a manufacturing method in which catalyst slurry is applied by a washcoating method using an aqueous medium is typically used. A slurry mixture in which ceria-alumina-based base material particles carrying Pt, Pd, and BaO on their surfaces and a binder, another catalyst, promotor particles, OSC material, other base material particles, an additive, and the like which are added as needed are mixed into water or a solvent in which a water-soluble organic solvent is added to water (hereinafter, sometimes simply referred to as the "aqueous medium"), at a desired mixing ratio is preferably used as the catalyst slurry for the first catalyst layer L1. When the catalyst layer L1a, L1b and the catalyst layer L1c are formed, catalyst slurry for each layer may be prepared in a similar manner. A slurry mixture in which ceria-alumina-based base material particles carrying Pt and Rh on their surfaces and a binder, another catalyst, promotor particles, OSC material, other base material particles, an additive, and the like which are added as needed are mixed into the aqueous medium at a desired mixing ratio is preferably used as the catalyst slurry for the second catalyst layer R1. The ceria-alumina-based base material particles can be allowed to carry precious metals, Ba, and the like on their surfaces by a normal method, and a preparation method thereof is not limited.

The ceria-alumina-based base material particles to be used are not limited, and commercially available ceria-alumina-based base material particles can be widely used. Ceria-alumina can be obtained by mixing a ceria raw material and an alumina raw material followed by firing using a method known in the art. The ceria raw material is not limited but various cerium salts such as a nitrate, carbonate, sulfate, acetate, chloride, and bromide and cerium oxide can be used.

When the ceria-alumina-based base material particles are allowed to carry Ba, for example, barium carbonate is finely pulverized and then mixed with the ceria-alumina-based base material particles to allow the surfaces of the ceria-alumina-based base material particles to carry Ba. From the viewpoint of highly dispersing barium, Ba is preferably supported on the ceria-alumina-based base material particles in a form of a soluble salt by impregnation. Barium chloride, barium hydroxide, barium acetate, barium nitrate, and the like can be used as the soluble salt of Ba, for example. The same is applied to other alkaline earth metal salts. For example, Mg is preferably supported on the ceria-alumina-based base material particles in a form of a soluble salt such as magnesium chloride, magnesium acetate, magnesium nitrate, and magnesium sulfate by impregnation.

After the ceria-alumina-based base material particles are allowed to carry the above-described homogeneous solution including a Ba component and a Mg component by an impregnation method or the like, the ceria-alumina-based base material particles can be dried at about 50° C. to 200° C. as needed and further fired at about 200° C. to 650° C., as needed, by known heating means such as an electrical furnace or a gas furnace to fix Ba in a form of BaO, $BaCO_3$, or the like on the surfaces of the ceria-alumina-based base material particles. When Ba is fixed as a carbonate on the surfaces of the ceria-alumina-based base material particles, elution of Ba and Mg from the ceria-alumina-based base material particles in slurry can be suppressed. However, while in the case where acetates are used or acetic acid is separately added, carbonates can be formed through decomposition of acetic acid, carbonates cannot be formed with other salts. Therefore, in order to form carbonates of alkaline earth metals such as Ba and Mg, a carbonate source is needed. In this case, monosaccharides such as white sugar, fructose, glucose, and galactose and disaccharides such as sucrose, maltose, and lactose are preferably used, for example. These carbonate sources are safe material, excellent in solubility, and sufficiently combust at a relatively low ignition temperature such as 350° C.; besides, the number of carbon atoms forming each molecular is 6 to 12 and is small. Therefore, these carbonate sources are likely to completely combust and hardly leave a residue such as soot when they combust. In the case where a combustible substance is used, the combustible substance generates heat at the time of combustion, and when the temperature of an electrical furnace is increased too high, Ba, Mg, and the like might be oxidized to barium oxide and magnesium oxide. Therefore, the temperature during combustion is desirably controlled to fall within a range of preferably 200° C. to 450° C. and more preferably 250° C. to 400° C. so as not to excessively increase the temperature.

When the ceria-alumina-based base material particles are allowed to carry Pt, for example, the ceria-alumina-based base material particles may be allowed to carry Pt by impregnation using a nitrate, sulfate, carbonate, acetate, or the like of platinum (specifically, an ethanolamine solution of platinum(IV) hydroxide, tetraammineplatinum(II) acetate, tetraammineplatinum(II) carbonate, tetraammineplatinum(II) nitrate, a nitric acid solution of platinum(IV) hydroxide acid, platinum nitrate, dinitrodiammineplatinum nitric acid, a hexahydroxy platinic acid aqueous solution, hexachloroplatinic(IV) acid, etc.). Dispersion processing and stirring processing can be performed as needed.

When the ceria-alumina-based base material particles are allowed to carry Pd and Rh, for example, the ceria-alumina-based base material particles may be allowed to carry Pd and Rh by impregnation using their nitrates, sulfates, carbonates, acetates, or the like of Pd and Rh (specifically, tetraamminepalladium(II) acetate, tetraamminepalladium(II) carbonate, tetraamminepalladium(II) nitrate, dinitrodiamminepalladium, palladium nitrate, palladium chloride, rhodium sulfate, rhodium acetate, rhodium nitrate, rhodium chloride, etc.). Dispersion processing and stirring processing can be performed as needed.

These catalyst components may be fired as needed. In this case, catalyst components after being fired and an aqueous medium are mixed to prepare a slurry mixture. The firing temperature at this time is preferably 200° C. to 650° C. and more preferably 250° C. to 600° C. Known heating means such as an electrical furnace and a gas furnace can be used as heating means.

The aqueous medium used in preparing a slurry mixture may be used at an amount enabling each component to homogeneously disperse in slurry. At this time, an acid or base for pH adjustment can be added, or a dispersant, surfactant, resin for dispersion, or the like for viscosity adjustment and for improving dispersibility can be added, as needed. Any known pulverization method or mixing method such as pulverization mixing using a ball mill or the like can be employed as a method for mixing slurry. When the slurry mixture is applied onto the substrate 11, various known coating methods, washcoating methods, and zone coating methods can be employed in line with normal methods.

The slurry mixture can be subjected to dry or wet pulverization processing, mixing processing, or dispersion processing using a ball mill, bead mill, or the like before preparation or during preparation for the purpose of obtaining homogeneous dispersion or obtaining a desired particle size. Processing conditions thereof can be appropriately set according to desired properties and are not limited. However, processing conditions can be set so that the ceria-alumina-based base material particles carrying essential components have a D90 particle diameter of preferably 1 to 30 μm, more preferably 3 to 25 μm, and still more preferably 7 to 20 μm, for example.

While viscosity of these slurry mixtures is not limited, a measured value obtained by a B-type viscosimeter is preferably 5 to 2000 mPa·s and more preferably 10 to 1000 mPa·s from the viewpoint of using the slurry mixtures with viscosity suitable for application by a washcoating method, for example.

A method of applying the slurry mixture may be any method known in the art and is not limited. For example, a known method such as spray coating and dip coating can be employed. Typically, a washcoating method is widely used in the field of catalyst coating. For example, the slurry mixture (catalyst composition) including catalyst components in the aqueous solvent described above and the substrate 11 such as an integral structure-type honeycomb carrier are prepared, and the slurry mixture (catalyst composition) may be applied onto the substrate 11 in layer form. In a case where catalyst layers are provided to form a multilayer structure as with the case of the catalyst layer L1*a*, L1*b* and the catalyst layer L1*c*, catalyst slurry for each layer may be applied several times in a similar manner. Coating performed by washcoating or the like can be repeated twice or more times. Furthermore, coating before drying may be repeated twice or more times, or a cycle of application and drying may be repeated twice or more times.

The LNT layered catalyst 100 of the present embodiment can be obtained by performing drying and firing according to a normal method after applying the slurry mixture onto the substrate 11. The drying temperature is preferably 50° C. to 250° C. and more preferably 80° C. to 230° C., for example. The firing temperature is preferably 300° C. to 700° C. and more preferably 400° C. to 600° C., for example. While heating means is not limited, known heating means such as an electrical furnace and a gas furnace can be employed, for example.

<Exhaust Gas Purification Using LNT Layered Catalyst 100>

The LNT layered catalyst 100 of the present embodiment can be used in a state where the LNT layered catalyst 100 is disposed in an exhaust gas flow passage of a lean combustion engine, preferably in an exhaust gas flow passage of a lean burn gasoline engine. The LNT layered catalyst 100 of the present embodiment purifies exhaust gas emitted due to lean combustion of a lean combustion engine. That is, the $NO_x$ storage material such as the Ba component is allowed to store $NO_x$ in a lean (lean atmosphere: a state where oxygen is excessively present compared with a theoretical oxygen amount relative to fuel injected) atmosphere, a rich (fuel-rich atmosphere) pulse is executed by injecting excessive fuel to temporally achieve an atmosphere with low oxygen, and the stored $NO_x$ is reduced thereby. That is, the $NO_x$ storage material such as the Ba component is an important active species in denitrification.

The LNT layered catalyst 100 of the present embodiment can be used in an integrated exhaust gas purification apparatus and exhaust gas purification system including one or more additional components for treating exhaust gas exhaust matters. Examples of the exhaust gas purification apparatus include an exhaust gas purification apparatus (TWC/LNT) provided with one or more three-way catalysts (TWC) disposed downstream of an exhaust gas flow passage of a lean combustion engine and one or more LNT layered catalysts 100 (LNT) disposed downstream of the three-way catalyst(s). A configuration of an exhaust gas purification apparatus (TWC/LNT/LNT) in which multiple LNT layered catalysts 100 are disposed may be provided as needed. Alternatively, a configuration of an exhaust gas purification apparatus (TWC/LNT/LNT2) in which the LNT layered catalyst 100 (LNT) and another known LNT catalyst (LNT2) are used may be provided. In any case, catalysts may be disposed adjacent to each other or may be disposed just below the engine and the underfloor of the chassis, respectively. The LNT layered catalyst 100 of the present embodiment can be located just below the engine or the underfloor of the chassis, and both of them.

EXAMPLES

Hereinbelow, features of the present invention will be described in more detail with reference to examples and comparative examples. However, the present invention is not limited by these examples. That is, the materials, use amounts, rates, possessing contents, processing procedures, and the like represented in the following examples can be appropriately modified without departing from the spirit of the present invention. In addition, various manufacturing conditions and evaluation result values in the following examples have significance as a preferable upper limit or a preferable lower limit in the embodiment of the present invention, and preferable ranges may be any range defined by a combination of any of the above-described upper and lower limits and any of the values shown in the following examples or a combination of the values shown in the following examples.

Example 1

First Catalyst Layer L1

The ceria-alumina-based base material particles having an alumina content of 50% by mass of Sample 2A described in Japanese Translation of PCT International Application Publication No. 2016-517343 were impregnated with a barium acetate aqueous solution and allowed to carry Ba on their surfaces followed by drying at 110° C. and firing at 720° C. to obtain ceria-alumina-based base material particles carrying barium. The obtained composite particles were impregnated with a palladium nitrate aqueous solution and a hexahydroxy platinic acid aqueous solution and allowed to carry platinum and palladium on the surfaces of the ceria-alumina-based base material particles. Predetermined amounts of the obtained Pt—Pd/Ba-carrying ceria-alumina-based base material particles, a magnesium acetate aqueous solution, and a zirconium acetate aqueous solution were weighed, respectively, and then mixed followed by kneading by a wet milling method to obtain a slurry mixture S1$c$ (mass ratios of respective components, calculated as respective metals, based on the total solid content of each layer are as follows. Pt: 0.06 mass %, Pd: 0.01 mass %, Rh: 0.00 mass %, $CeO_2/Al_2O_3$: 80 parts by mass, and BaO: 9.8 parts by mass) for the catalyst layer L1$c$ of the first catalyst layer L1.

Slurry mixtures S1$a$ and S1$b$ (mass ratios of respective components are as follows. Pt: 0.25 mass %, Pd: 0.03 mass %, Rh: 0.00 mass %, $CeO_2/Al_2O_3$: 80 parts by mass, and BaO: 9.8 parts by mass) for the catalyst layers L1$a$ and L1$b$ of the first catalyst layer L1 were obtained in the same manner as described above except that the carrying amounts of Pt and Pd were changed.

A flow-through type honeycomb cordierite carrier (cell density: 400 cell/inch$^2$, wall thickness: 3.5 mil, square cell, length: 114.3 mm, diameter: 105.7 mm), which was the substrate 11, was coated with the obtained slurry mixture S1$c$ for the catalyst layer L1$c$ by a washcoating method (coating amount: 80 g/L, in terms of solid content of the ceria-alumina-based base material particles, per unit volume of the substrate 11), dried at 200° C. for 30 minutes, and subsequently fired at 500° C. for one hour in the atmosphere to form a catalyst layer L1$c$ on the substrate 11. Thereafter, in the same manner, the obtained slurry mixture S1$b$ for the catalyst layer L1$b$ was applied onto the catalyst layer L1$c$ by a washcoating method (coating amount: 80 g/L, in terms of solid content of the ceria-alumina-based base material particles, per unit volume of the substrate 11) followed by drying and firing to form a catalyst layer L1$b$ on the catalyst layer L1$c$. Furthermore, in the same manner, the obtained slurry mixture S1$a$ for the catalyst layer Lia was applied onto the catalyst layer L1$b$ by a washcoating method (coating amount: 80 g/L, in terms of solid content of the ceria-alumina-based base material particles, per unit volume of the substrate 11) followed by drying and firing to form a catalyst layer L1$a$ on the catalyst layer L1$b$. In this manner, a first catalyst layer L1 (layered catalyst) having a layer structure in which the catalyst layer L1$c$, the catalyst layer L1$b$, and the catalyst layer L1$a$ were provided on the substrate 11 in this order was obtained.

Second Catalyst Layer R1

The ceria-alumina-based base material particles having an alumina content of 50% by mass of Sample 2A described in Japanese Translation of PCT International Application Publication No. 2016-517343 were impregnated with a rhodium nitrate aqueous solution and a hexahydroxy platinic acid aqueous solution and allowed to carry rhodium and platinum on the surfaces of the ceria-alumina-based base material particles. Predetermined amounts of the obtained Pt—Rh-carrying ceria-alumina-based base material particles and a neodymium nitrate aqueous solution were weighed, respectively, and then mixed followed by kneading by a wet milling method to obtain a slurry mixture (mass ratios of respective components, calculated as respective metals, based on the total solid content of each layer are as follows. Pt: 0.90 mass %, Pd: 0.00 mass %, Rh: 0.27 mass %, $CeO_2/Al_2O_3$: 43 parts by mass, and BaO: 0 parts by mass) for the second catalyst layer R1.

In the same manner as the forming method of the first catalyst layer L1 described above, the slurry mixture for the second catalyst layer R1 was applied onto the catalyst layer L1a by a washcoating method (coating amount: 43 g/L, in terms of solid content of the ceria-alumina-based base material particles, per unit volume of the substrate 11) followed by drying and firing to form a second catalyst layer R1 on the catalyst layer L1a. In this manner, an LNT layered catalyst 100 of Example 1 in which the first catalyst layer L1 (catalyst layer L1a, catalyst layer L1b, and catalyst layer L1c) and the second catalyst layer R1 were provided on the substrate 11 in this order was obtained.

Example 2

Slurry mixtures S2a, S2b, and S2c for catalyst layers L1a, L1b, and L1c were respectively prepared in the same manner as in Example 1 except that the carrying amount of BaO was changed to 4.9 parts by mass.

An LNT layered catalyst 100 of Example 2 was obtained in the same manner as in Example 1 except that the slurry mixtures S2a, S2b, and S2c were used instead of the slurry mixtures S1a, S1b, and S1c.

Comparative Example 1

Slurry mixtures SC1a, SC1b, and SC1c for catalyst layers L1a, L1b, and L1c were respectively prepared in the same manner as in Example 1 except that the carrying amount of BaO was changed to 14.7 parts by mass.

An LNT layered catalyst 100 of Comparative Example 1 was obtained in the same manner as in Example 1 except that the slurry mixtures SC1a, SC1b, and SC1c were used instead of the slurry mixtures S1a, S1b, and S1c.

Comparative Example 2

Slurry mixtures SC2a, SC2b, and SC2c for catalyst layers L1a, L1b, and L1c were respectively prepared in the same manner as in Example 1 except that the processing for carrying BaO was omitted.

An LNT layered catalyst 100 of Comparative Example 2 was obtained in the same manner as in Example 1 except that the slurry mixtures SC2a, SC2b, and SC2c were used instead of the slurry mixtures S1a, S1b, and S1c.

Reference Example 1

The ceria-alumina-based base material particles having an alumina content of 50% by mass of Sample 2A described in Japanese Translation of PCT International Application Publication No. 2016-517343 were impregnated with a barium acetate aqueous solution and allowed to carry Ba on their surfaces followed by drying at 110° C. and firing at 600° C. to obtain ceria-alumina-based base material particles carrying barium. The obtained composite particles were impregnated with a palladium nitrate aqueous solution and a hexahydroxy platinic acid aqueous solution and allowed to carry platinum and palladium on the surfaces of the ceria-alumina-based base material particles. Predetermined amounts of the obtained Pt—Pd/Ba-carrying ceria-alumina-based base material particles, a magnesium acetate aqueous solution, and a zirconium acetate aqueous solution were weighed, respectively, and then mixed followed by kneading by a wet milling method to obtain a slurry mixture SR1 (mass ratios of respective components, calculated as respective metals, based on the total solid content of each layer are as follows. Pt: 0.17 mass %, Pd: 0.02 mass %, Rh: 0.00 mass %, $CeO_2/Al_2O_3$: 80 parts by mass, and BaO: 19.6 parts by mass) for the first catalyst layer L.

A flow-through type honeycomb cordierite carrier (cell density: 400 cell/inch$^2$, wall thickness: 3.5 mil, square cell, length: 114.3 mm, diameter: 105.7 mm), which was the substrate 11, was coated with the obtained slurry mixture SR1 by a washcoating method (coating amount: 80 g/L, in terms of solid content of the ceria-alumina-based base material particles, per unit volume of the substrate 11), dried at 200° C. for 30 minutes, and subsequently fired at 500° C. for one hour in the atmosphere to form a catalyst layer L1c on the substrate 11. These processes were repeated twice to form a catalyst layer L1b (L1c) and a catalyst layer L1a (L1c), and a first catalyst layer L1 (layered catalysts of catalyst layer L1c, catalyst layer L1b (L1c), and catalyst layer L1a (L1c)) was formed thereby. The same processes as in Example 1 were carried out thereafter to form a second catalyst layer R1 on the first catalyst layer L1, and an LNT layered catalyst of Reference Example 1 was obtained thereby.

Catalyst compositions of respective LNT layered catalysts are shown in Table 1.

TABLE 1

| | | | Precious metal components calculated as mass in each catalyst layer [mass %] | | | Catalyst components (excluding precious metals) [g/L] | | Pt/BaO ratio in L1 | BaO content ratio in L1 [%] |
|---|---|---|---|---|---|---|---|---|---|
| | | | Pt | Pd | Rh | $CeO_2Al_2O_3$-based base material | BaO | | |
| Reference Example 1 | Second catalyst layer R1 | | 0.90 | 0.00 | 0.27 | 43 | 0 | — | — |
| | First catalyst layer L1 | Depth region L1a | 0.17 | 0.02 | 0.00 | 240 | 58.8 | 0.03 | 17.4 |
| | | Depth region L1b | 0.17 | 0.02 | 0.00 | | | | |
| | | Depth region L1c | 0.17 | 0.02 | 0.00 | | | | |

TABLE 1-continued

| | | | Precious metal components calculated as mass in each catalyst layer [mass %] | | | Catalyst components (excluding precious metals) [g/L] | | Pt/BaO ratio in L1 | BaO content ratio in L1 [%] |
|---|---|---|---|---|---|---|---|---|---|
| | | | Pt | Pd | Rh | $CeO_2Al_2O_3$-based base material | BaO | | |
| Comparative Example 1 | Second catalyst layer R1 | | 0.90 | 0.00 | 0.27 | 43 | 0 | — | — |
| | First catalyst layer L1 | Depth region L1a | 0.24 | 0.03 | 0.00 | 240 | 44.1 | 0.04 | 13.7 |
| | | Depth region L1b | 0.24 | 0.03 | 0.00 | | | | |
| | | Depth region L1c | 0.06 | 0.01 | 0.00 | | | | |
| Example 1 | Second catalyst layer R1 | | 0.90 | 0.00 | 0.27 | 43 | 0 | — | — |
| | First catalyst layer L1 | Depth region L1a | 0.25 | 0.03 | 0.00 | 240 | 29.4 | 0.06 | 9.5 |
| | | Depth region L1b | 0.25 | 0.03 | 0.00 | | | | |
| | | Depth region L1c | 0.06 | 0.01 | 0.00 | | | | |
| Example 2 | Second catalyst layer R1 | | 0.90 | 0.00 | 0.27 | 43 | 0 | — | — |
| | First catalyst layer L1 | Depth region L1a | 0.27 | 0.04 | 0.00 | 240 | 14.7 | 0.12 | 5.0 |
| | | Depth region L1b | 0.27 | 0.04 | 0.00 | | | | |
| | | Depth region L1c | 0.07 | 0.01 | 0.00 | | | | |
| Comparative Example 2 | Second catalyst layer R1 | | 0.90 | 0.00 | 0.27 | 43 | 0 | — | — |
| | First catalyst layer L1 | Depth region L1a | 0.28 | 0.04 | 0.00 | 240 | 0 | — | 0.0 |
| | | Depth region L1b | 0.28 | 0.04 | 0.00 | | | | |
| | | Depth region L1c | 0.07 | 0.01 | 0.00 | | | | |

[Measurement of $NO_x$ Storage Rate and $NO_x$ Purification Rate]

Next, catalyst performance of each LNT layered catalyst obtained was measured.

Figure 2:
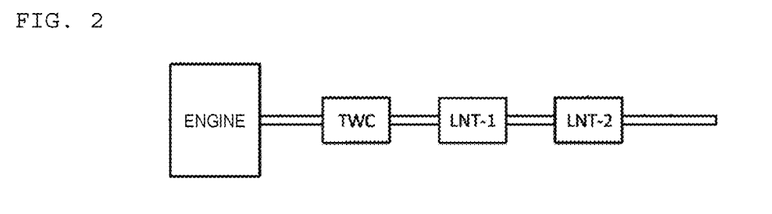
FIG. 2 is a schematic configuration diagram of an exhaust gas purification apparatus provided with one embodiment of the LNT layered catalyst 100.

Evaluation herein was carried out using a 1.8-liter direct injection lean burn gasoline engine with a three-way catalyst disposed just below the engine and using an engine dynamometer. As shown in FIG. 2, the catalyst layout was a configuration in which two LNT-1 (capacity: 1.0 L) units and an LNT-2 (capacity: 2.5 L) unit were disposed behind a TWC unit in this order. Then, gas from TWC and gas from LNT-2 were sampled, gas analysis was conducted on each of them, and a $NO_x$ purification rate and $NO_x$ storage rate were respectively calculated from the difference therebetween. MEXA-ONE manufactured by HORIBA, Ltd. was used as an analyzer, and the position at which temperature was measured was set within the catalyst layer one inch from the front side of LNT-1.

Catalyst performance in the case where an amount of air flowing into each LNT layered catalyst system was 20 g/second is shown in Table 2.

TABLE 2

| | $NO_x$ storage rate [%] | | | | | $NO_x$ purification rate [%] | | | | |
|---|---|---|---|---|---|---|---|---|---|---|
| Temperature [° C.] | Reference Example 1 | Comparative Example 1 | Example 1 | Example 2 | Comparative Example 2 | Reference Example 1 | Comparative Example 1 | Example 1 | Example 2 | Comparative Example 2 |
| 250 | 75.8 | 85.3 | 87.0 | 93.2 | 74.9 | 68.4 | 81.3 | 80.1 | 84.9 | 59.9 |
| 300 | 87.1 | 92.1 | 97.2 | 98.4 | 84.8 | 84.7 | 90.4 | 96.4 | 98.1 | 73.4 |
| 350 | 93.6 | 96.4 | 100.0 | 99.1 | 78.6 | 92.2 | 95.0 | 99.7 | 98.9 | 69.6 |
| 400 | 97.8 | 96.1 | 100.0 | 99.0 | 62.8 | 94.3 | 93.6 | 98.9 | 98.2 | 53.0 |

Catalyst performance of each LNT layered catalyst measured when the temperature within the bet of the LNT layered catalyst disposed at the front was set to 300° C. and an amount of air flowing into the system was set to 15 g/second, 20 g/second, or 30 g/second is shown in Table 3.

TABLE 3

| Air amount [g/sec] | $NO_x$ storage rate [%] | | | $NO_x$ purification rate [%] | | |
|---|---|---|---|---|---|---|
| | Reference Example 1 | Example 1 | Example 2 | Reference Example 1 | Example 1 | Example 2 |
| 15 | 93.1 | 99.9 | 99.5 | 91.2 | 99.7 | 99.5 |
| 20 | 87.1 | 97.2 | 98.4 | 84.7 | 96.4 | 98.1 |
| 30 | 76.5 | 91.2 | 86.7 | 71.2 | 88.2 | 83.3 |

Catalyst performance of each LNT layered catalyst measured when the temperature within the bet of the LNT layered catalyst disposed at the front was set to 350° C. and an amount of air flowing into the system was set to 15 g/second, 20 g/second, or 30 g/second is shown in Table 4.

TABLE 4

| Air amount [g/sec] | $NO_x$ storage rate [%] | | | $NO_x$ purification rate [%] | | |
|---|---|---|---|---|---|---|
| | Reference Example 1 | Example 1 | Example 2 | Reference Example 1 | Example 1 | Example 2 |
| 15 | 96.9 | 100.0 | 99.8 | 95.3 | 100.0 | 99.8 |
| 20 | 93.6 | 100.0 | 99.1 | 92.2 | 99.7 | 98.9 |
| 30 | 85.1 | 97.6 | 94.2 | 81.9 | 96.3 | 93.1 |

Figure 3:
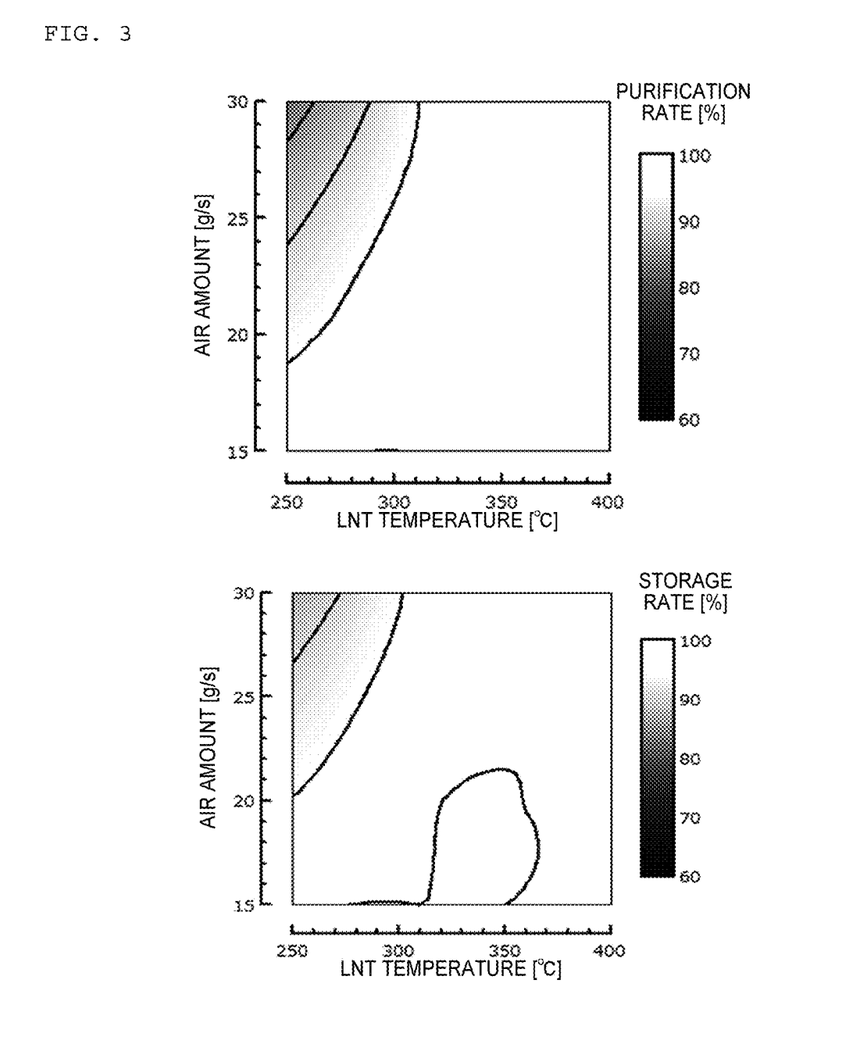
FIG. 3 shows contour diagrams showing the relationship among the LNT temperature, the amount of air, and the $NO_x$ purification rate and $NO_x$ storage rate of the LNT layered catalyst of Example 1.
Figure 4:
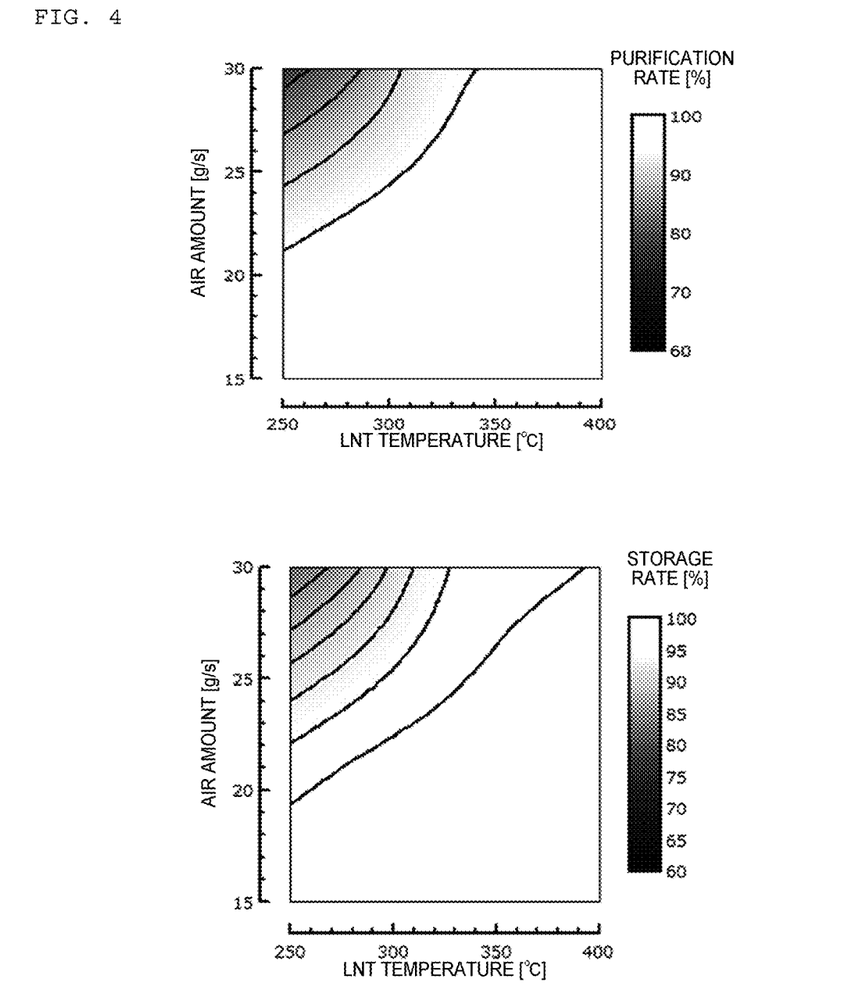
FIG. 4 shows contour diagrams showing the relationship among the LNT temperature, the amount of air, and the $NO_x$ purification rate and $NO_x$ storage rate of the LNT layered catalyst of Example 2.
Figure 5:
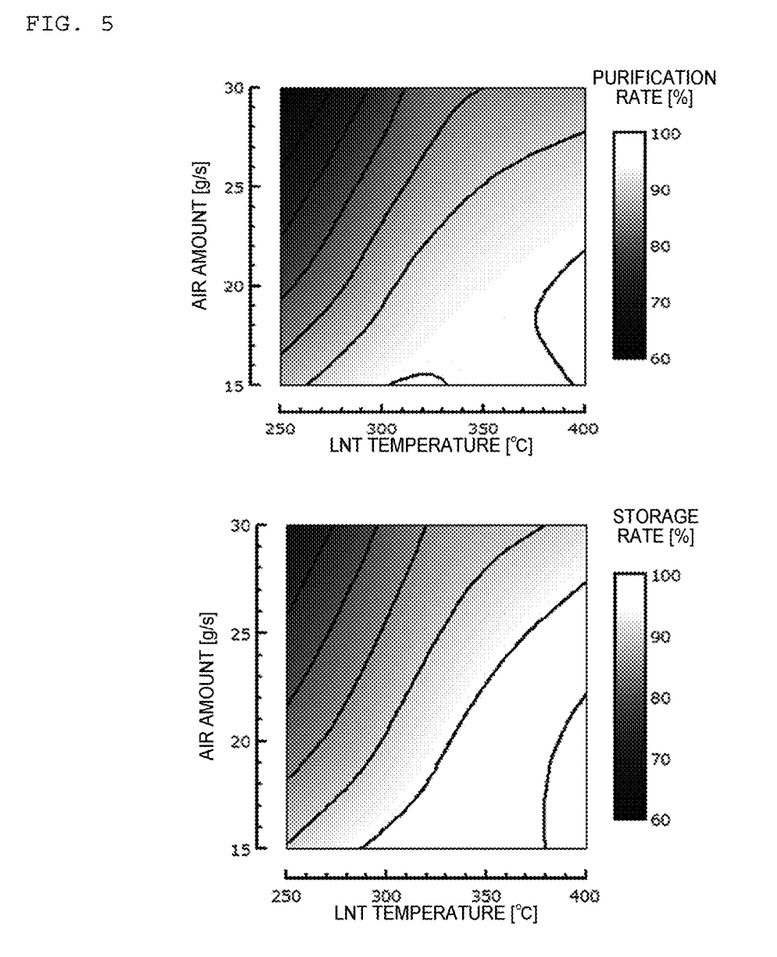
FIG. 5 shows contour diagrams showing the relationship among the LNT temperature, the amount of air, and the $NO_x$ purification rate and $NO_x$ storage rate of the LNT layered catalyst of Reference Example 1.

Contour diagrams showing the relationship among the LNT temperature, the amount of air, and the $NO_x$ purification rate and $NO_x$ storage rate of Example 1, Example 2, and Reference Example 1 are shown in FIG. 3 to FIG. 5, respectively.

INDUSTRIAL APPLICABILITY

The LNT layered catalyst of the present invention and the exhaust purification apparatus or the like using the same have a further enhanced $NO_x$ storage rate and are capable of developing a higher $NO_x$ purification rate, and therefore can be widely and effectively utilized in application for exhaust gas purification of lean burn gasoline engines effectively utilizing a small amount of fuel.

REFERENCE SIGNS LIST

100 . . . LNT layered catalyst
11 . . . substrate
L1 . . . first catalyst layer
L1a . . . depth region
L1b . . . depth region
L1c . . . depth region
R1 . . . second catalyst layer
T . . . thickness
B . . . boundary plane

What is claimed is:

1. An LNT layered catalyst for a lean burn gasoline engine, comprising a substrate, a first catalyst layer provided on the substrate, and a second catalyst layer provided on the first catalyst layer, wherein
the first catalyst layer includes ceria-alumina-based base material particles, Pt and Pd supported on the ceria-alumina-based base material particles, and BaO supported on the ceria-alumina-based base material particles, the first catalyst layer having a thickness T,
the second catalyst layer includes cerin-alumina-based base material particles and Pt and Rh supported on the ceria-alumina-based base material particles,
a boundary plane positioned between the first catalyst layer and the second catalyst layer, and
requirements (A) to (D) below are satisfied:
(A) a content of Pt included in the first catalyst layer is 0.45% to 0.85% by mass, in terms of metal, based on a total solid content of the first catalyst layer,
(B) a content proportion of Pt in a region ranging from the boundary plane to ⅔ in the thickness T of the first catalyst layer is 88% to 90% by mass based on a total Pt amount included in the first catalyst layer,
(C) a content proportion of Pt included in a depth region ranging from ⅔ to 3/3 in the thickness direction T of the first catalyst layer with reference to the boundary plane (B) is 10% to 12% by mass based on the total Pt amount included in the first catalyst layer, and
(D) a content of Ba included in the first catalyst layer is 4% to 11% by mass, in terms of oxide, based on a total amount of the first catalyst layer, and a content of Ba in the second catalyst layer is less than 1% by mass in terms of oxide (BaO) based on the total amount of the second catalyst layer.

2. The LNT layered catalyst for a lean burn gasoline engine according to claim 1, wherein
requirements and below are further satisfied:
a content proportion of Pt included in a depth region ranging from the boundary plane (B) to ⅓ in the thickness direction T of the first catalyst layer is 40% to 50% by mass based on the total Pt amount included in the first catalyst layer, and
a content proportion of Pt included in a depth region ranging from ⅓ to ⅔ in the thickness direction T of the first catalyst layer with reference to the boundary plane is 40% to 50% by mass based on the total Pt amount included in the first catalyst layer.

3. The LNT layered catalyst for a lean burn gasoline engine according to claim 1, wherein
a ratio (Pt/BaO) between the total Pt amount and a total BaO amount included in the first catalyst layer is 0.05 to 0.15 in terms of mass.

4. The LINT layered catalyst for a lean burn gasoline engine according to claim 1, wherein
the substrate is an integral structure-type honeycomb carrier.

5. The LNT layered catalyst for a lean burn gasoline engine according to claim 4, wherein
the substrate is a flow-through-type honeycomb carrier.

6. The LNT layered catalyst for a lean burn gasoline engine according to claim 4, wherein
the substrate is a wall-flow-type honeycomb carrier.

7. The LNT layered catalyst for a lean burn gasoline engine according to claim 1, wherein
the first catalyst layer further has an alkaline-earth metal salt other than BaO.

8. The LNT layered catalyst for a lean burn gasoline engine according to claim 1, wherein
the second catalyst layer contains substantially no alkaline-earth metal salt.

9. An exhaust gas purification system, comprising:
a three-way catalyst disposed downstream of an exhaust gas flow passage of a lean combustion engine; and the LNT layered catalyst for a lean burn gasoline engine according to claim 1 disposed downstream of the three-way catalyst.

10. An exhaust gas purification system, comprising:
a three-way catalyst disposed downstream of an exhaust gas flow passage of a lean combustion engine; a first LNT layered catalyst for a lean burn gasoline engine according to claim 1 disposed downstream of the three-way catalyst; and a second LNT layered catalyst for a lean burn gasoline engine according to claim 1 disposed downstream of the first LNT layered catalyst for a lean burn gasoline engine.

* * * * *